(12) United States Patent
Hole

(10) Patent No.: US 8,374,610 B2
(45) Date of Patent: Feb. 12, 2013

(54) SYSTEMS AND METHODS FOR INDEPENDENT SETTING OF CELL CHANGE NETWORK CONTROL MODE AND NOTIFICATION OF CELL CHANGE MODE FOR UNCONTROLLED CELLS

(75) Inventor: David Philip Hole, Slough (GB)

(73) Assignee: Research in Motion Limited, Waterloo (CA)

( * ) Notice: Subject to any disclaimer, the term of this patent is extended or adjusted under 35 U.S.C. 154(b) by 328 days.

(21) Appl. No.: 12/690,816

(22) Filed: Jan. 20, 2010

(65) Prior Publication Data

US 2011/0177817 A1    Jul. 21, 2011

(51) Int. Cl.
*H04W 36/00* (2009.01)

(52) U.S. Cl. ............................................... 455/436

(58) Field of Classification Search ........... 455/436–444
See application file for complete search history.

(56) References Cited

U.S. PATENT DOCUMENTS

| 7,957,743 | B2 | 6/2011 | Moe et al. |
|---|---|---|---|
| 2006/0116118 | A1 | 6/2006 | Charriere et al. |
| 2008/0130585 | A1 | 6/2008 | Park et al. |
| 2008/0267153 | A1 | 10/2008 | Mukherjee et al. |
| 2009/0061881 | A1 | 3/2009 | Gonsa et al. |
| 2009/0291686 | A1 | 11/2009 | Alpert et al. |
| 2010/0027507 | A1 | 2/2010 | Li et al. |
| 2010/0075680 | A1 | 3/2010 | Ramachandran et al. |
| 2010/0165948 | A1 | 7/2010 | Ore et al. |
| 2010/0260147 | A1 | 10/2010 | Xing et al. |
| 2010/0290431 | A1 | 11/2010 | Yang et al. |
| 2010/0323704 | A1 | 12/2010 | Tailor et al. |
| 2011/0090857 | A1 | 4/2011 | Guo |
| 2011/0105119 | A1 | 5/2011 | Bienas et al. |

FOREIGN PATENT DOCUMENTS

| EP | 0933962 A2 | 8/2009 |
|---|---|---|
| WO | 2008/041115 A1 | 4/2008 |
| WO | 2008/131583 A1 | 11/2008 |

OTHER PUBLICATIONS

3GPP TS 45.008, 3GPP, Published Nov. 2009, Radio subsystem link control.*
3GPP TS 45.060, 3GPP, Published Dec. 2009, RLC/MAC protocol.*
3GPP: 3GPP Technical Specification Mobile radio interface layer 3 specification; Radio Resource Control (RRC) protocol (Release 9) 3GPP TS44.018 V9.3.0, Dec. 1, 2009, pp. 1, 164-169, XP002624705, Retrieved from the Internet: URL: http://www.3gpp.org/ftp/Specs/archive/44_series/44.018/44018-930.zip [retrived on Feb. 1, 2011] chapter 9.1.15.
International Search Report and Written Opinion dated Mar. 22, 2011 from PCT International Application No. PCT/EP2011/050411.
Partial International Search Report dated May 11, 2011 from PCT International Application No. PCT/EP2011/050410.

(Continued)

*Primary Examiner* — Steven Lim
(74) *Attorney, Agent, or Firm* — Novak Druce + Quigg LLP

(57) ABSTRACT

Systems and Methods for Independent Setting of Cell Change Network Control Mode and Notification of Cell Change Mode for Uncontrolled Cells are provided. In some cases, separate behavior is specified for mobile stations in respect of uncontrolled cells. In some cases, behavior is signaled by the signaling used for normal cells, but different meaning is attributed to the signaling. In some cases, at least one further criterion is combined with the signaling for controlled cells to determine the behavior for controlled cells. In some cases, additional signaling is employed.

17 Claims, 5 Drawing Sheets

OTHER PUBLICATIONS

LG Electronics Inc: "CSG Cell Detection" 3GPP Draft; R2-097012 CSG Cell Detection, 3rd Generation Partnership Project (3GPP), Mobile Competence Centre; 650, Route Des Ducioles, F-06921 Sophia-Antipolis Cedex; France, No. Jeju; 20091109, Nov. 9, 2009; XP050391385.

Partial International Search Report dated Mar. 30, 2011 from PCT International Application No. PCT/EP2011/050408.

Motorola Ltd et al.: "Definition of use of E_UTRAN_BA_IND and PSI3_CHANGE_MARK with E-UTRAN related information and other clarifications", 3GPP Draft, GP-091730 [GP-091713] CR_44060-REL-9 E-UTRAN_BA_IND, #rd Generation Partnership Project (3GPP), Mobile Competence Centre; 650, Route Des Lucioles; F-06921 Sophia-Antipolis Cedex; France, vol. TSG GERAN, No. Vancouver; 20090831, Sep. 4, 2009, XP050415754.

Nokia Corporation et al: "Measurement Reporting Parameters for CSG Cells" 3GPP Draft; GP-092022_CSG_PARAMETERS, 3rd Generation Partnership Project (3GPP), Mobile Competence Centre; 650, Route Des Lucioles; F-06921 Sophia-Antipolis Cedex; France, vol. TSG GERAN, No. Sophia, 20091116, Nov. 11, 2009, XP050415993.

Nokia Siemens Networks et al: "Signalling changes for CSG inbound mobility in connected mode", 3GPP Draft; FP-092023_DRAFT_CR_44060_CSG_SIGNALLING, 3rd Generation Partnership Project (3GPP), Mobile Competence Centre; 650, Route Des Lucioles; F-06921 Sophia-Antipolis Cedex; France, vol. TSG GERAN, No. Sophia, 20091116, Nov. 11, 2009, XP050415994.

R2-097000, "CSG inbound handover—way forward", NTT Docomo, 3GPP TSG-RAN WG2 #68, Jeju, Korea, Nov. 9-13, 2009.

GP-092382 "Working Assumptions on "Inbound Mobility to CSG Cells in Connected Mode"", (source 3GPP GERAN WG2), 3GPP TSG GERAN #44, Sophia Antipolis, France, Nov. 16-20, 2009.

R2-097445 CR 36.331-0258 rev 3 "Slight revision of baseline CR capturing agreements on inbound mobility", Samsung, 3GPP TSG-RAN WG2 #68, Jeju, Korea, Nov. 9-13, 2009.

R2-097466 CR 36.331-0318 rev 1 "Introduction of network ordered SI reporting", NTT Docomo, 3GPP TSG-RAN WG2 #68, Jeju, Korea, Nov. 9-13, 2009.

GP-092023 "Signalling Changes for CSG inbound mobility in connected mode" 3GPP TSG-3GPP GERAN #44, Sophia Antipolis, France, Nov. 16-20, 2009.

3GPP TS 44.060 (latest version is v.9.2.0) "General Packet Radio Service (GPRS); Mobile Station (MS)—Base Station System (BSS) interface; Radio Link Control / Medium Access Control (RLC/MAC) protocol". Release 9, Dec. 2009.

3GPP TS 45.008: "Radio subsystem link control". (latest version is v.9.1.0), Release 9, Nov. 2009.

3GPP TS 44.018 "Mobile radio interface layer 3 specification; Radio Resource Control Protocol". (latest version is 9.3.0), Release 9, Dec. 2009.

3GPP TS 48.008 "Mobile Switching Centre—Base Station System (MSC-BSS) interface; Layer 3 specification " (latest version is 9.1.0), Release 9, Dec. 2009.

3GPP TS 43.129 Packed-switched handover for GERAN A/Gb mode; Stage 2 (defines Handover Preparation; latest version is 9.0.0), Release 9, Dec. 2009.

3GPP TS 48.018 "General Packet Radio Service (GPRS); Base Station System (BSS)—Serving GPRS Support Node (SGSN); BSS GPRS protocol (BSSGP)" (latest version is 9.0.0), Release 9, Dec. 2009.

3GPP TS 23.009—V9.0.0, Technical Specification Group Core Network and Terminals; Handover procedures, Release 9, Dec. 2009.

3GPP TS 23.008—V9.1.0, Technical Specification Group Core Network and Terminals;Organization of subscriber data, Release 9, Dec. 2009.

3GPP TS 25.304—V9.0.0, Technical Specification Group Radio Access Network; User Equipment (UE) procedures in idle mode and procedures for cell reselection in connected mode, Release 9, Dec. 2009.

3GPP TS 36.304—V9.1.0, Technical Specification Group Radio Access Network; Evolved Universal Terrestrial Radio Access (E-UTRA); User Equipment (UE) procedures in idle mode, Release 9, Dec. 2009.

3GPP TS 36.104—V9.2.0, Technical Specification Group Radio Access Network; Evolved Universal Terrestrial Radio Access (E-UTRA); Base Station (BS) radio transmission and reception, Release 9, Dec. 2009.

Non-final Office Action dated Oct. 7, 2011; in corresponding U.S. Appl. No. 12/690,750.

3rd Generation Partnership Project; Technical Specification Group Services and System Aspects; 3GPP System Architecture Evolution: Report on Technical Options and Conclusions (Release 7), 3GPP TR 23.882, V1.4.2, (Oct. 2006).

3rd Generation Partnership Project; Technical Specification Group Services and System Aspects; Voice Call Continuity (VCC) between Circuit Switched (CS) and IP Multimedia Subsystem (IMS); Stage 2 (Release 7), 3GPP TS 23.206, V7.0.0, (Sep. 2006).

3rd Generation Partnership Project; Technical Specification Group GERAN; Packet-switched handover for GERAN A/Gb mode; Stage 2 (Release 6), 3GPP TS 43.129 V6.9.0 (Sep. 2006).

* cited by examiner

SYSTEMS AND METHODS FOR INDEPENDENT SETTING OF CELL CHANGE NETWORK CONTROL MODE AND NOTIFICATION OF CELL CHANGE MODE FOR UNCONTROLLED CELLS

FIELD

The application relates cell change in wireless networks, and in particular to notification of cell change, and network control over cell change.

BACKGROUND

Some cells are uncontrolled in the sense that a PLMN (public land mobile network) operator does not control the location and/or operation of the cell. Other cells are controlled in the sense that the operator does control the both the location and operation of the cells. Examples of uncontrolled cells include, for example, CSG (closed subscriber group) cells, cells controlled by home enode b's and home node b's. These cells are also sometimes referred to as being "uncoordinated" in the sense that they are not subject to normal radio/cell planning.

It is generally understood that there are many methods of performing a handover for controlled cells. Inbound handover in this context refers to a cell change from a target cell's perspective where resources (for example timeslots, frequency channels, scrambling codes, etc.) for transmission and/or reception in the cell are allocated to a mobile station in advance of the mobile station performing a cell change to that cell, particularly in response to a request from the controller of the device's serving cell.

While the uncontrolled cells may be configured to use spectrum that is owned by the operator, the network operator does not have the same control over uncontrolled cells as for controlled cells. Typically, the network operator does not own the support structure (towers etc.), does not own or control the backhaul connection (e.g. Digital Subscriber Line (DSL) connections), does not know or control when a given uncontrolled cell is going to be switched on, and may not know or control the locations of uncontrolled cells. The operator will typically still have control of various parameters such as operating frequency, transmit power, etc. if the operator owns the spectrum license.

In order to perform a handover to a target cell, controlled or uncontrolled, a MS (mobile station) typically needs to provide identifying information relating to the target cell to the current serving cell so that it can initiate a handover process. In particular, the current serving cell needs to be able to communicate with (possibly via a core network) the cell controller for the target cell. However, the current serving cell may not be aware of how to reach the cell controller for the target cell, particularly if the target cell is an uncontrolled cell, unless provided with explicit identification information for the cell (such as a cell global identity). This makes handover to such cells difficult. In contrast, for a controlled target cell, it may be sufficient for the mobile station to provide the current serving cell with information about the target cell. This does not require or cause the acquisition of any broadcast information from the target controlled cell for the serving cell to be able to reach the cell controller for the target controlled cell, since the serving cell or some part of the network may be able to map other identifying features of the cell (such as operating frequency, scrambling code etc.) to the identity of the target cell or its controller.

There are three modes of operation relating to mobility from a GERAN (GSM EDGE (Enhanced Data rates for GSM Evolution) Radio Access Network) cell to another (not necessarily GERAN) cell. The commanded mode is indicated in broadcast signalling (NETWORK_CONTROL_ORDER sent in SI2quater message, see 3GPP TS 44.018), but may also be signalled in point-to-point signalling. The commanded mode applies both in packet transfer mode and in packet idle mode. If a circuit-switched connection is active (e.g. in a voice call), different procedures apply (approximately similar to the rules for NC2 described below, although handover is the only permitted means of cell change in this case). The three modes are:

NC0: In this mode, cell reselection is autonomous (i.e. is performed by the mobile without being prompted by the network). Criteria for reselection are specified and parameters relating to these criteria may be transmitted by the network;

NC2: In this mode, the mobile sends measurement reports to the network indicating the signal strength/quality of neighbouring cells; based on these reports, the network directs the mobile to perform cell reselection or handover. Autonomous reselection in this mode is not permitted; and NC1: This is a hybrid of NC0 and NC2; in this mode, the mobile station performs autonomous reselection if the appropriate criteria are met. However, the mobile station also transmits measurement reports to the network, allowing the network to trigger reselection/handover as in NC2 mode.

The network may indicate that a CCN (Cell Change Notification) procedure should be performed by a particular mobile station, or mobile stations generally, in respect of certain neighbour cells or neighbour cells using a certain radio access technology (RAT). Typically the network indicates that the Cell Change Notification procedure is to be performed through broadcast system information. However, it may also be signalled using point-to-point signalling (e.g. in a Packet Measurement Order (PMO) message). The existing fields to indicate this include:

CCN_ACTIVE (sent in GPRS (General Packet Radio Service) Cell Options, see 3GPP TS 44.060, applicable to GSM (Global System for Mobile Communications) cells), CCN_SUPPORTED (sent in System Information (SI) type 2quater (SI2quater) see 3GPP TS 44.018, applicable to individual GSM target cells), 3G_CCN_ACTIVE, E-UTRAN_CCN_ACTIVE (sent in SI2quater, applicable to 3G (Third Generation, such as UMTS (Universal Mobile Telecommunications System)) and E-UTRAN (Evolved Universal Terrestrial Radio Access Network) cells respectively; these indications apply on a per-RAT basis, i.e. to all target cells of that radio access technology).

With current definitions, CCN is applicable only when the mobile station is in packet transfer mode and in either NC0 or NC1 mode.

If, for the target cell for which reselection criteria are met, CCN is active or enabled, then the mobile station sends a Packet Cell Change Notification (PCCN) message to the network identifying the selected target cell before performing reselection.

Upon receiving a PCCN, the network may:

a) do nothing: after timers elapse at the mobile station, the mobile station will continue with reselection;

b) order the mobile station to continue reselection to the selected cell, by sending a Packet Cell Change Continue (PCCC) message; a Packet Cell Change Order (PCCO) message may also be used in this case;

c) order the mobile station to perform reselection to a different cell by sending a Packet Cell Change Order (PCCO) message;

d) initiate a packet-switched handover procedure; this involves a preparation phase in which the target cell receives advance notification of the mobile station's intended cell change, the target cell reserves resources and informs the mobile, via the serving cell, of these resources. This approach can reduce the service interruption time associated with cell change.

Before sending a PCCO or PCCC indicating a cell change to a GERAN cell, the network may send neighbour cell system information to the mobile station. This may include some or all of the system information that the mobile station would otherwise need to receive in the target cell before establishing packet transfer mode. One of the benefits of the CCN procedure is to allow the mobile station to receive this information before performing reselection and hence to avoid needing to receive it in the target cell, which may cause service interruption.

Before sending a packet-switched handover command where the target cell is a GSM cell, the network sends the neighbour cell system information.

BRIEF DESCRIPTION OF THE DRAWINGS

Embodiments of the application will now be described with reference to the attached drawings in which.

DETAILED DESCRIPTION

Figure 1:
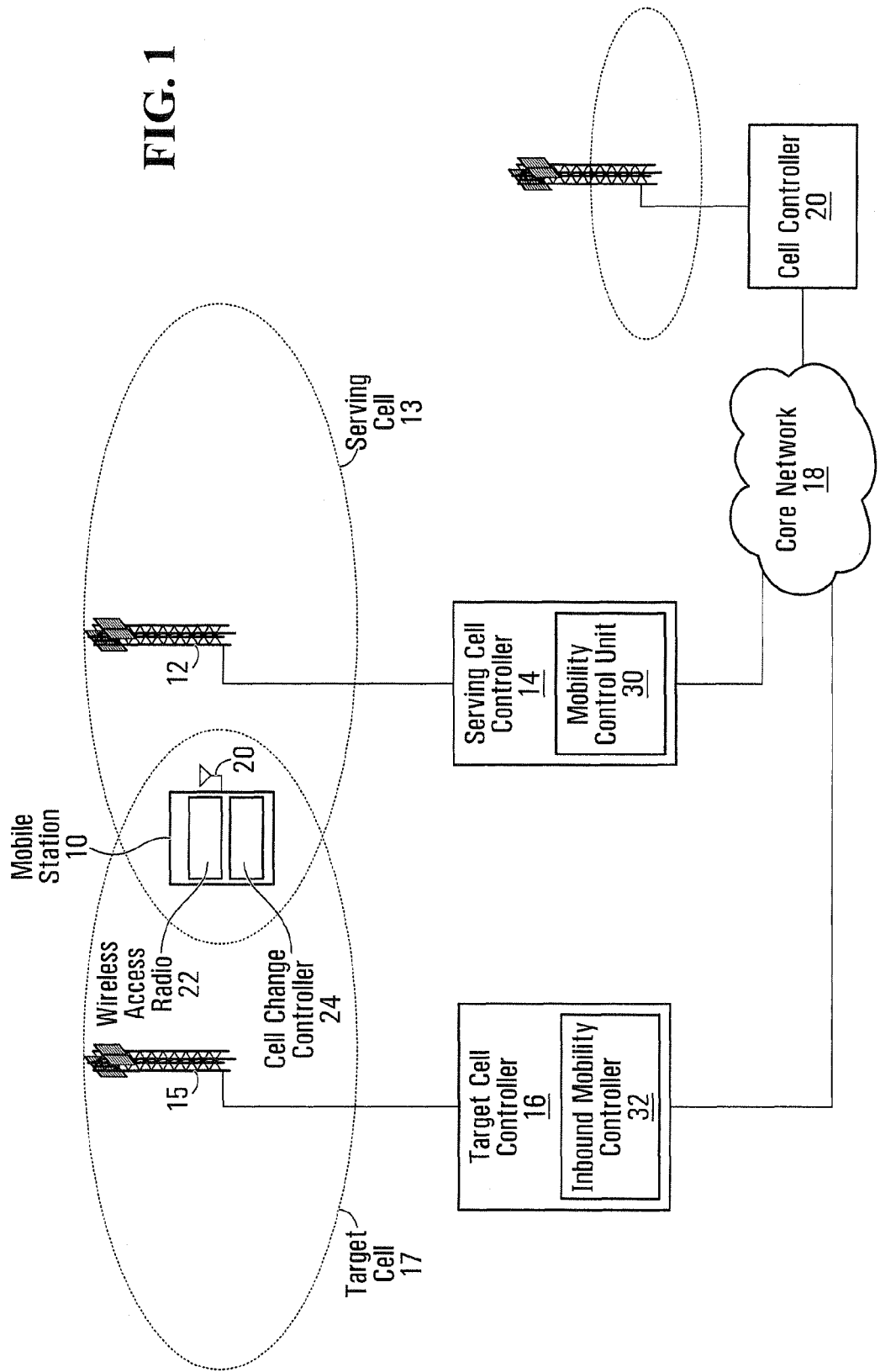
FIG. 1 is a schematic diagram of a mobile station, serving cell and target cell.

It should be understood at the outset that although illustrative implementations of one or more embodiments of the present disclosure are provided below, the disclosed systems and/or methods may be implemented using any number of techniques, whether or not currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For the CCN mode and NC modes as currently specified, there is no specific mention of uncontrolled cells in the specifications for CCN procedures or the definition of NC0/NC1/NC2. It is therefore implicit that the same procedures (for example signaling procedures specified in 3GPP TS 44.060) apply for uncontrolled cells as for any other target cell of the same RAT.

A set of modes were described in the background, namely NC0, NC1, NC2, and these related to different modes/levels of network control over mobile station cell change. These modes have been defined in respect of cells generally with no distinction between the cells being controlled or uncontrolled. These modes are specific examples of cell change network control modes. More generally, a set of cell change network control modes encompasses a set of modes featuring differing network control and/or mobile station autonomy with respect to cell reselection. The above-described set of modes {NC0, NC1 and NC2} is a specific example of a set of cell change network control modes. The embodiments described herein are not limited to this particular set.

Similarly, the behaviour of the mobile station in terms of cell change notification is either "CCN active" (or "CCN enabled") in which case cell change notification is performed, or not, in which case cell change notification is not performed. This has been defined in respect of cells generally with no distinction between the cells being controlled or uncontrolled. In the description of the embodiments that follow, references to NCC (notification of cell change) mode refer generally to a mode of a mobile station in terms of whether a notification of a cell change is required to be sent to the serving cell in advance of performing a cell change, in which case the NCC mode of mobile station is NCC required mode, or is not required to be sent to the serving cell in advance of performing the cell change, in which case the NCC mode of the mobile station is NCC not required mode. The above-referenced CCN behaviour is a specific example of this which is detailed, for example, in 3GPP TS 44.060, but it is to be clearly understood that uses of NCC mode described herein are not limited to CCN behaviour thus defined.

In some embodiments, a separate cell change network control mode setting is specified for uncontrolled cells, and a separate NCC mode setting is specified for uncontrolled cells. The mode settings assignable for uncontrolled cells may be the same or different from the assignable modes defined for controlled cells. However, this embodiment is in terms of the ultimate behaviour of the mobile station. It is not necessary that new modes be defined, but simply that the mobile station does not apply the setting defined for controlled cells in respect of uncontrolled cells.

More generally, an improved flexibility is provided such that at least one of the cell change network control mode and NCC mode applicable to a category of cell can be applied that is different from that signalled or otherwise specified already for cells of the same RAT. The "defined category of cell" may be based on one or more of:

whether or not the cell is a CSG cell whether or not the cell is controlled by a H(e)NB whether or not the cell is an uncontrolled cell whether or not inbound handover to the cell is known not to be supported whether or not inbound handover to the cell is known to be supported whether or not outbound handover from the serving cell to the target cell is known to be supported.

In the description that follows, cell controller is a generic term which could, for example, refer to base station controllers (BSC), radio network controllers (RNC) or eNodeB (eNB) or Home eNodeB; generally for the purpose of this description, it is used to mean an entity which controls the cell in some sense. For example, a cell controller might be an entity which initiates a handover preparation procedure for a mobile station ("serving cell controller") or which allocates resources in a target cell as part of a handover procedure ("target cell controller"). The serving cell controller may, for example, be responsible for processing measurement reports, cell change notifications and similar messages received from a mobile station and based on these (and other implementation-specific considerations) generating mobility commands (such as packet cell change order messages) to be transmitted to the mobile station and/or initiating handover preparation. A GERAN BSS is an example. The same entity or entities may function as a serving cell controller in respect of the cell when performing a serving cell role and a target cell controller when the same cell is performing a target cell role. A cell controller may perform the control function for one or multiple cells. In some cases, a cell controller performs the control function for one cell and is co-located with other cell components, such as a component containing a wireless transceiver, such as a base station. A cell controller may be a part of a BSS (base station subsystem) which includes the transceiver. References to a cell sending or receiving something refer to a wireless transceiver sending or receiving something, possibly under control of the cell controller of the cell.

Referring to FIG. 1, shown is a schematic diagram in which a mobile station 10 has a wireless connection to a serving cell transceiver 12 within serving cell 13. Also shown is a serving cell controller 14, target cell transceiver 15 within target cell 17, and target cell controller 16. Of course, other network elements may be present, such as core network elements 18 and other cell controllers 20. The core network elements may, for example, include one or more of an SGSN (serving GPRS support node), MSC (mobile switching centre), MME (mobility management entity). The signalling over the air interface (between a transceiver and a mobile station) is typically performed at the RLC (radio link control)/MAC (medium access control) layer. Signalling between a BSS and core network is separate from RLC/MAC.

The serving cell controller 14 is configured with a mobility control unit 30 that enables the serving cell controller to perform one or a combination of two or more of the serving cell controller methods described herein.

The mobility control unit 30 may be implemented in hardware, or software running on a processing platform such as a processor or combination of processors, or a combination of hardware and software. The mobility control unit 30 may be implemented as part of/a change to another component forming part of a serving cell controller. The serving cell controller 14 includes other components (not shown) to allow it to perform the serving cell controller functionality.

The target cell controller 16 is configured with an inbound mobility controller 32 that enables the target cell controller to perform one or a combination of two or more of the target cell controller methods described herein. The inbound mobility controller 32 may be implemented in hardware, or software running on a processing platform such as a processor or combination of processors, or a combination of hardware and software. The inbound mobility controller 32 may be implemented as part of/a change to another component forming part of a target cell controller. The target cell controller 16 includes other components (not shown) to allow it to perform the target cell controller functionality.

A cell controller may be implemented that includes both the mobility control unit 30 and the inbound mobility controller 32.

The mobile station 10 has at least one antenna 20, and at least one wireless access radio 22. In addition, them mobile station is configured with a cell change controller 24 that enables the mobile station to perform one or a combination of two or more of the mobile station methods described herein. The cell change controller 24 may be implemented in hardware, or software running on a processing platform such as a processor or combination of processors, or a combination of hardware and software. The cell change controller 24 may be implemented as part of/a change to another component forming part of a mobile station. The mobile station 10 includes other components (not shown) to allow it to perform mobile station functionality.

Various embodiments that comprise methods implemented by a mobile station or cell controller will now be described with reference to FIGS. 3 to 7. For each method, unless clearly necessary for the method to function, it is not necessary that the steps be executed in the sequence depicted or described.

Figure 3:
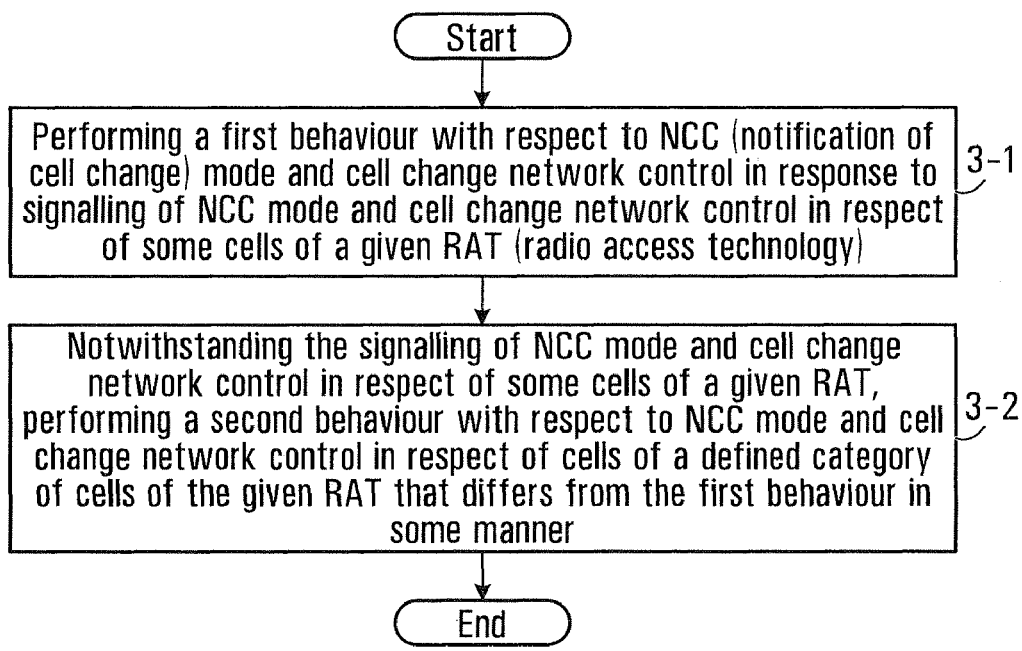
FIGS. 3 to 7 are flowcharts of methods for execution by a mobile station or cell controller.

FIG. 3 is a flowchart of a method for execution by a mobile station. The method involves, while in packet transfer mode, performing a first behaviour with respect to NCC (notification of cell change) mode and cell change network control in response to signalling of NCC mode and cell change network control in respect of some cells of a given RAT (radio access technology) (3-1); notwithstanding the signalling of NCC mode and cell change network control in respect of some cells of a given RAT, performing a second behaviour with respect to NCC mode and cell change network control in respect of cells of a defined category of cells of the given RAT that differs from the first behaviour in some manner (3-2). In some embodiments, block 3-2 applies while in packet transfer mode. Many of the other embodiments described below may be considered as specific examples of the method of FIG. 3; specifically, the so-called "second behaviour" is the behaviour defined for these other embodiments in respect of cells of the defined category of cells.

Figure 4:
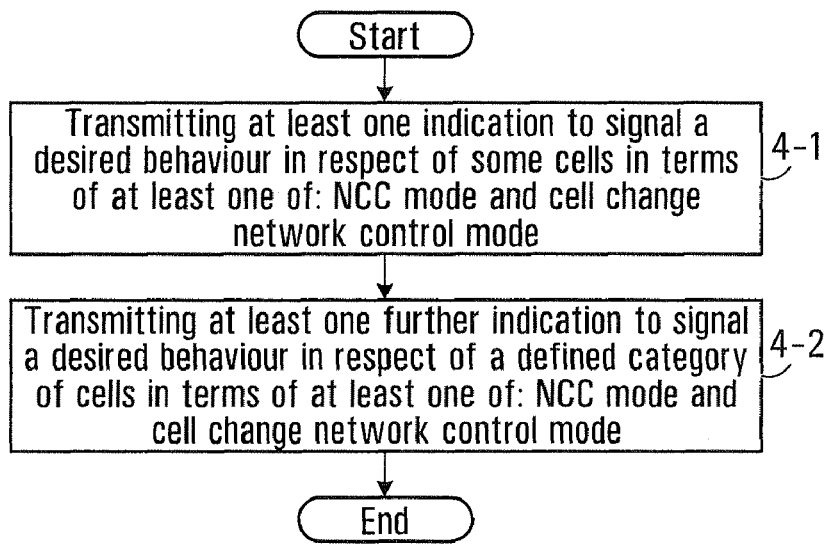

FIG. 4 is a flowchart of a method for execution by a serving cell controller. The method involves transmitting at least one indication to signal a desired behaviour in respect of some cells in terms of at least one of: NCC mode and cell change network control mode (block 4-1); transmitting at least one further indication to signal a desired behaviour in respect of a defined category of cells in terms of at least one of: NCC mode and cell change network control mode (block 4-2).

Figure 5:
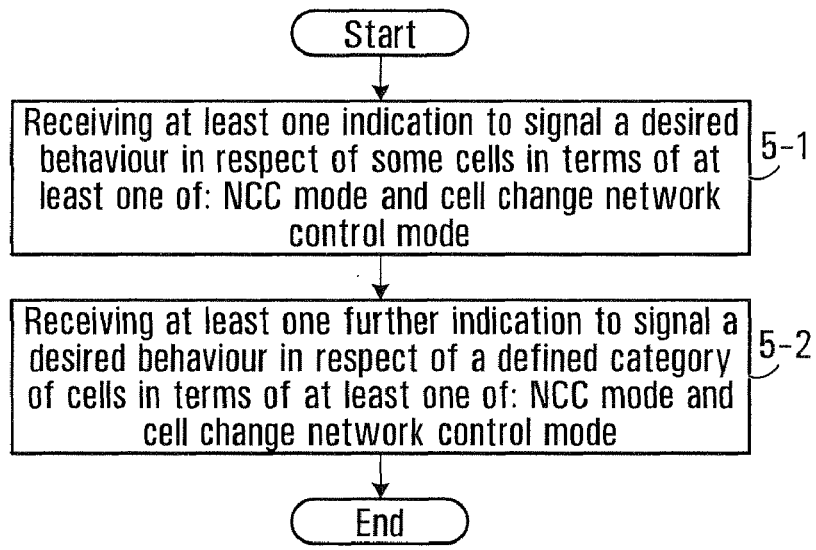

FIG. 5 is a flowchart of a method for execution by a mobile station. The method involves receiving at least one indication to signal a desired behaviour in respect of some cells in terms of at least one of: NCC mode and cell change network control mode (block 5-1); receiving at least one further indication to signal a desired behaviour in respect of a defined category of cells in terms of at least one of: NCC mode and cell change network control mode (block 5-2).

Figure 6:
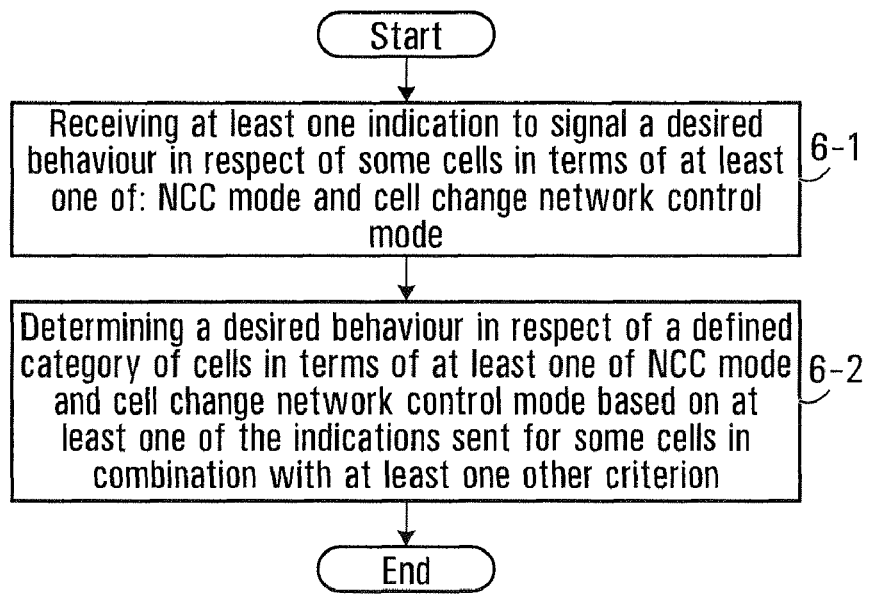

FIG. 6 is a flowchart of a method for execution by a mobile station. The method involves receiving at least one indication to signal a desired behaviour in respect of some cells in terms of at least one of: NCC mode and cell change network control mode (block 6-1); determining a desired behaviour in respect of a defined category of cells in terms of at least one of NCC mode and cell change network control mode based on at least one of the indications sent for some cells in combination with at least one other criterion (block 6-2).

Figure 7:
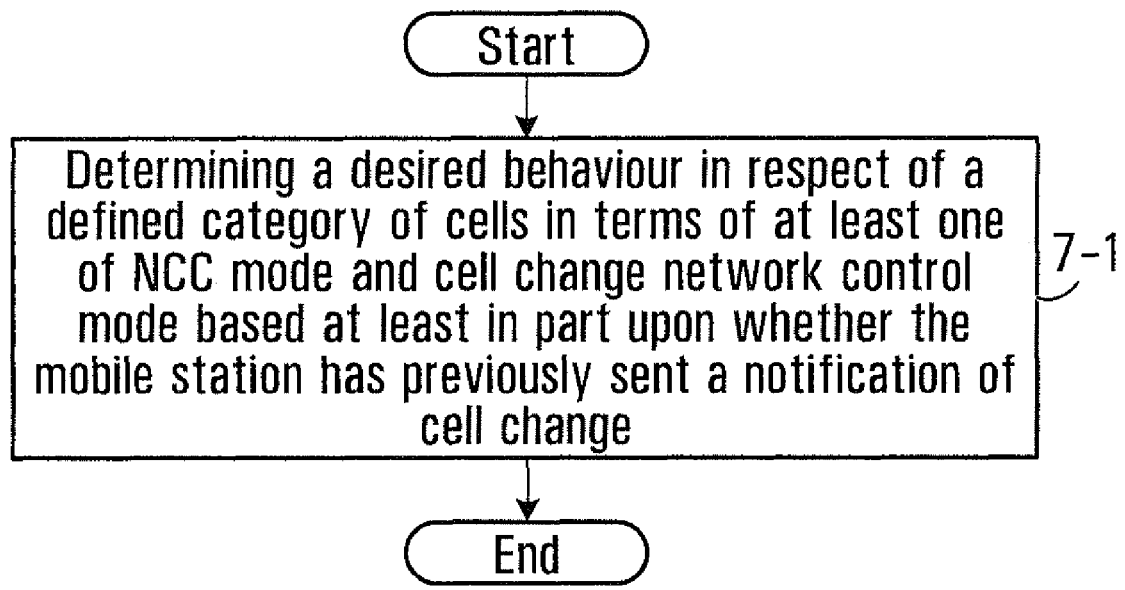

FIG. 7 is a flowchart of a method for execution by a mobile station. The method involves determining a desired behaviour in respect of a defined category of cells in terms of at least one of NCC mode and cell change network control mode based at least in part upon whether the mobile station has previously sent a notification of cell change (block 7-1).

Further embodiments provide computer readable media having computer executable instructions stored thereon, that when executed by an appropriate processing device, such as a mobile device or a cell controller, execute any one or more of the methods described herein.

Detailed examples of the above-described methods will now be described. The examples provided below provide for the definition of the notification/configuration of the NCC mode and cell change network control mode for a defined category of cells (such as uncontrolled cells) as opposed to NCC mode and cell change network control mode for other cells (for example controlled cells). In some embodiments, respective notification/configurations of the NCC mode and cell change network control mode are defined for each of a plurality of different categories of cells.

Specification of Differing Behaviour for Mobile Station in Respect of a Defined Category of Cells In some embodiments, the behaviour of the mobile station is different for a defined category of cells, than for other cells of the same RAT through specification of the mobile station. For such embodiments, in general, the mobile station is configured to perform a first behaviour in respect of NCC mode and cell change network control in response to signalling of NCC required mode and cell change network control in respect of some cells of a given RAT. In addition, notwithstanding the signalling of NCC required mode and cell change network control in respect of some cells of a given RAT, the mobile station performs a second behaviour in respect of NCC mode and cell change network control in respect of cells of a defined category of cells of the given RAT that differs from the first behaviour in some manner. Various specific examples follow.

In some embodiments, the mobile station is configured to never enter NCC required mode, nor to send a notification of cell change mode in respect of a defined category of cells for a given RAT, such as uncontrolled cells, notwithstanding the NCC mode or cell change network control mode defined for cells of the same RAT.

In some embodiments, for a defined category of cells, the mobile station is configured to obey the NCC mode signalled for other cells of the same RAT. For autonomous reselection, the mobile station is configured to perform in a defined manner, for example so as to allow autonomous reselection, irrespective of the cell change network control mode signalled for other cells.

In some embodiments, for a defined category of cells, the mobile station is configured to obey the cell change network control mode signalled for other cells of the same RAT. For NCC mode, the mobile station is configured to be behave in a defined manner, for example so as to always send an NCC (or never to send an NCC), irrespective of the NCC mode signalled for other cells.

In some embodiments, for a defined category of cells, the signalling transmitted for other cells is used (one or both of NCC mode and cell change network control). However, the behaviour specified by the signalling is different in respect of cells of the defined category than for other cells.

In some embodiments, the second behaviour involves, for a defined category of cells of a given RAT, performing at least one of autonomous reselection and notification of cell change notwithstanding one or both of signalled NCC required mode and cell change network control for some cells of the given RAT.

Explicit Signalling

In some embodiments, new indications are defined to explicitly signal a desired behaviour in terms of notification of cell change, and/or cell change network control mode. These indications may be transmitted as part of broadcast system information, or may be transmitted point to point. In some embodiments, a separate indication for each of NCC mode and cell change network control mode is used. In some embodiments a single indication conveys both NCC mode and cell change network control mode. These indications may be broadcast, for example through system information, or may be transmitted point to point. In some embodiments, at least one indication is sent that is further to indication(s) sent for other cells to signal a desired behaviour in respect of some cells in terms of at least one of NCC mode; and cell change network control mode.

In a first specific example, a first new field is defined to indicate a cell change network control mode applicable for the defined category of cells. In another example, a second new field is defined to indicate whether NCC is required for the defined category of cells. One or both of the first new field and the second new field may be implemented. In some embodiments, a single field indicates both the cell change network control mode and the NCC mode for the defined category of cells.

In a specific example, for the cell change network control mode, a new field is referred to as "NC_MODE_CSG_E-UTRAN" in the detailed example below that might be defined for target E-UTRAN uncontrolled cells. In another example, a new field is defined to indicate whether NCC is required for target E-UTRAN uncontrolled cells. In some embodiments, a field or fields similar to those defined above are defined for UTRAN uncontrolled cells.

Implicit Signalling

In some embodiments, the desired behaviour in respect of a defined category of cells in terms of notification of cell change, and/or cell change network control mode is implicitly signalled, for example, based on a combination of other fields/capabilities. This signalling may be broadcast, for example through system information, or may be transmitted point to point.

In some embodiments, the NCC mode and cell change network control mode for a defined category of cells (such as uncontrolled cells) is determined as a function of the indications of NCC mode and cell change network notification mode for other cells (such as controlled cells) in combination with at least one other criterion. The at least one other criterion may, for example, involve the transmission of a further indication that is specific to the defined category of cells, or capabilities of the serving cell and/or target cell controllers (such as BSS, HeNB, HNB) to name a few specific examples.

In a first example, the desired cell change network control mode and NCC mode for the defined category of cells is based on the current applicable cell change network control mode for controlled cells and/or the current NCC mode applicable for other cells (for example controlled cells) in combination with whether or not the serving cell controller supports handover to cells of the defined category, or more generally in combination with whether or not handover from the serving cell to cells of the defined category is supported by the network, where "network" refers to any appropriate entity other than the mobile station. The MS may learn the behaviour of the current serving cell in this regard, for example by means of broadcast system information, or point-to-point signaling (e.g. in PACKET MEASUREMENT ORDER messages) or both.

A second example which is specific to the above-described NC0, NC1 and NC2 cell change network control modes and CCN behaviour will now be described. The desired cell change network control mode for uncontrolled cells is defined to be the same as the current applicable cell change network control mode for controlled cells if the current cell change network control mode is NC0 or NC1. Where the cell change network control mode for controlled cells is NC2, another new field is employed (example is "CSG_NC2" defined in detail below), which specifies how the mobile station is to behave in respect of uncontrolled cells if NC2 is applicable for controlled cells. In a particular example, the new field selectively indicates one of:

NC2 is never applicable to uncontrolled cells, and the MS should apply NC1 behaviour (with CCN active) in respect of uncontrolled cells—e.g. set new field to "0" to signal this;

rules for NC2 that apply to controlled cells also apply also to uncontrolled cells—e.g. set new field to "1" to signal this.

In another example, a new field (referred to as "CSG_CCN" in the detailed example below) is used to specify how the mobile station is to behave in respect of a defined category of cells if notification of cell change is required for other cells. In a particular example, the new field selectively indicates one of:
- notification of cell change is never applicable for a defined category of cells (e.g. uncontrolled cells of a particular RAT), and if in a mode that allows autonomous cell change (for example NC0/NC1) to a cell of the defined set of cells and in packet transfer mode, the mobile station may perform autonomous reselection to a cell of the defined category of cells without sending a notification of cell change regardless of the whether cell change notification is required for other cells (for example controlled cells)—e.g. new field set to "0",
- the rules and indicators for notification of cell change that apply to other cells (for example controlled cells) apply also to the cells of the defined type—e.g. new field set to "1".

NCCS Mode

NCCS (NCC (notification of cell change) sent) mode refers to a mode or state of a mobile station after having sent a notification of cell change. In a specific example, after having sent a PCCN, a mobile station is referred to as being in "CCN mode". In some embodiments, the behaviour of the mobile station in terms of NCC and/or cell change network control is also a function of whether the mobile station is in NCCS mode. As above, the behaviour may be defined to be different for different defined categories of cells considering one or both of the category of the currently considered target cell and the category of the cell in respect of which the NCC was sent. For example, the behaviour defined for CSG cells while in NCCS mode for a non-CSG cell may be defined differently to behaviour defined for 2G cells while in NCCS mode for a 3G cell.

NCC Mode and Cell Change Network Control Mode Subject to Support for Handover

In some embodiments, the behaviour, in terms of the possibility to perform autonomous reselection and whether such reselection is to be notified in advance to the network, may also take account of whether there is handover support with respect to the serving cell and/or the target cell. Mechanisms for learning whether handover is supported in respect of a target cell are provided in co-pending U.S. application Ser. No. 12/690,803 filed the same day as this application, entitled "Systems and Methods For Informing Serving Cell of Target Cell Handover Capability" (52404-287) hereby incorporated by reference in its entirety. For example, if packet switched handover is known not to be possible (because either or both of the serving cell controller and target cell controller do not support the feature), then the mobile station may be permitted to perform autonomous reselection to the target cell without sending a notification to the serving cell, regardless of cell change network control mode, and whether or not notification of cell change is required for other cells, for example even when in a cell change network control mode that otherwise prohibits such autonomous reselection and/or when in NCC required mode.

The approaches described may provide more flexibility for the operator in terms of controlling mobility towards controlled and uncontrolled cells, potentially taking into account the different mobility mechanisms supported for controlled and uncontrolled target cells. The approaches may reduce signalling, for example of PCCN, PCCO/PCCC, and/or delay when network behaviour would otherwise be to always accept a proposed cell change towards a uncontrolled cell. The approaches may avoid unnecessary signalling in the case where handover is not possible.

First Set of Examples

Network Behaviour—Inform Mobile Station Whether to Notify Serving Cell of Cell Change A first parameter is used to indicate whether a mobile station should notify the serving cell controller of a cell change prior to performing the cell change (for example through a cell change notification procedure, for example to enter CCN mode) for cells, for example, of a given RAT. The first parameter applies to cells other than cells of a defined category (or categories) unless otherwise indicated by the second parameter introduced below. Examples of defined categories include uncontrolled cells; 3G CSG cells; E-UTRAN CSG cells.

A second parameter is used to indicate whether the first parameter also applies to cells of the defined category.

The parameters introduced above may be sent as part of system information broadcast to all mobile stations, or as part of a mobile station specific message.

Network Behaviour—Inform Mobile Station of Cell Change Network Control for a Defined Category of Cells The following two paragraphs are about cell change network control mode. This may control both measurement reporting and whether autonomous reselection is permitted. If it is permitted, then the CCN mode setting indicates whether it is required to notify the network in such case.

In some embodiments, a first parameter is used to request a mobile station to send measurement reports in respect of a set of cells, for example controlled cells of, for example, a given RAT. A second parameter is sent to indicate whether the first parameter also applies to cells of a defined category of the given RAT, for example uncontrolled cells.

In some embodiments, if the second parameter is set to a first value, then the first parameter applies to target cells of the defined category, and the mobile station sends measurement reports accordingly. If the second parameter is set to a second value, then the mobile station performs autonomous reselection to cells of the defined category, and does not include measurements of these cells in measurement reports.

Mobile Station Behaviour

Upon receiving a parameter(s) that indicate to the mobile station to notify the serving cell of a cell change for an uncontrolled cell, the mobile station performs such notification, although other criteria may also be imposed.

Detailed Example

The following is a detailed implementation example of the network behaviour introduced above.

A message, such as an SI2quater message may also contain the 3G_CCN_ACTIVE parameter in order to indicate whether the MS shall perform the CCN procedures in the serving cell when re-selecting to a 3G neighbour cell, see 3GPP TS 44.060. In some embodiments, the 3G_CCN_ACTIVE parameter is used to indicate if CCN is activated in serving cell towards 3G neighbour cells other than those known to be CSG cells; it applies also to 3G CSG cells if indicated by the 3G_CSG_CCN_ACTIVE parameter.

The SI2quater message may also contain the E-UTRAN_CCN_ACTIVE parameter in order to indicate whether the MS shall perform the CCN procedures in the serving cell when re-selecting to an E-UTRAN neighbour cell, see 3GPP TS 44.060.

In some embodiments, the E-UTRAN_CCN_ACTIVE parameter is used to indicate if CCN is activated in the serving cell towards E-UTRAN neighbour cells other than those known to be CSG cells; it applies also to E-UTRAN CSG cells if indicated by the EUTRAN_CSG_CCN_ACTIVE parameter.

The following is a specific example format of the fields introduced above:

<3G_CSG_CCN_ACTIVE: bit>
<3G_CSG_NETWORK_CONTROL: bit>;
<EUTRAN_CSG_CCN_ACTIVE: bit>
<EUTRAN_CSG_NETWORK_CONTROL: bit>;

and the following is a specific example of the contents of the fields:

3G_CSG_CCN_ACTIVE (1 bit field)
If set to '1', then {CCN is enabled towards 3G CSG cells and/or the 3G_CCN_ACTIVE field applies also to 3G CSG cells}. If set to '0' then CCN is disabled towards 3G CSG cells.

3G_CSG_NETWORK_CONTROL (1 bit field)
If set to '1', the NETWORK_CONTROL_ORDER parameter applies in respect of 3G CSG cells.

EUTRAN_CSG_CCN_ACTIVE (1 bit field)
If set to '1', then {CCN is enabled towards E-UTRAN CSG cells and/or the E-UTRAN_CCN_ACTIVE field applies also to E-UTRAN CSG cells}. If set to '0' then CCN is disabled towards E-UTRAN CSG cells.

EUTRAN_CSG_NETWORK_CONTROL (1 bit field)
If set to '1', the NETWORK_CONTROL_ORDER parameter applies in respect of E-UTRAN CSG cells.

Detailed Example

The following is a detailed implementation example of the mobile station behaviour introduced above.

A mobile station, which has CCN Enabled (a specific example of NCC required), can enter CCN Mode (CCN mode being the mode of a mobile station that has transmitted a PCCN). The mobile station shall enable CCN when the following criteria are fulfilled:

the mobile station is camping on a cell (see 3GPP TS 45.008); and
the network indicates CCN ACTIVE/3G CCN ACTIVE/E-UTRAN CCN ACTIVE either in system information to all mobile stations in the cell or in an individual order to a certain mobile station; and
if the target cell is known to be a 3G CSG cell (respectively E-UTRAN CSG cell), the network indicates 3G_CSG_CCN_ACTIVE (respectively EUTRAN_CSG_CCN_ACTIVE either in system information to all mobile stations in the cell or in an individual order to the mobile station; and
the mobile station is neither in dedicated mode nor Dual Transfer Mode; and
the mobile station is in NC0 or in NC1 mode for the target cell; and
the mobile station is in Packet Transfer mode.

The CCN procedures and the criteria for entering and leaving CCN mode are specified in sub-clauses 8.8.2 and 8.8.3. of 3GPP TS 44.060.

Detailed Example—Network Controlled Cell Re-selection

The network may request measurement reports from the mobile station and control its cell re-selection. This is indicated by the parameter NETWORK_CONTROL_ORDER. The meaning of the different parameter values is specified as follows:

NC0 Normal MS control
The MS shall perform autonomous cell re-selection.
NC1 MS control with measurement reports
The MS shall send measurement reports to the network as defined in subclause 10.1.4.1.
The MS shall perform autonomous cell re-selection.
NC2 Network control
The MS shall send measurement reports to the network as defined in subclause 10.1.4.1.
The MS shall only perform autonomous cell re-selection when the reselection is triggered by a downlink signalling failure as defined in subclause 6.5 or a random access failure as defined in 3GPP TS 44.018 and 3GPP TS 44.060 or if the cell is barred or the C1 criterion falls below zero. The MS shall only determine whether the cell is barred once camped on the cell.
RESET The MS shall return to the broadcast parameters. Only sent on PCCCH or PACCH.

The parameter values NC1 and NC2 only apply in GMM Ready state (A/Gb mode) or RRC-Cell_Shared state (Iu mode). In GMM Standby state (A/Gb mode) or RRC-Idle mode or RRC-GRA_PCH state (Iu mode), the MS shall always use normal MS control independent of the ordered NC mode.

A set of measurement reporting parameters (including NETWORK_CONTROL_ORDER) is broadcast on BCCH and, excepting E-UTRAN parameters, on PBCCH if it exists. This set of parameters may also be sent individually to an MS on PACCH or, excepting E-UTRAN parameters, on PCCCH in:

a PACKET MEASUREMENT ORDER message, in which case it overrides the NC parameters broadcast in the serving cell. These individual parameters are only valid in the serving cell.
a PACKET CELL CHANGE ORDER message, in which case it overrides the NC parameters broadcast in the target cell. These individual parameters are only valid in the target cell.

The individual parameters are valid until the RESET command is sent to the MS or there is a downlink signalling failure or a random access failure or if the cell is barred or the C1 criterion falls below zero or the MS goes to the GMM Standby state (A/Gb mode) or RRC-Idle mode or RRC-GRA_PCH state (Iu mode) or MS enters dedicated mode (A/Gb mode) or RRC-Cell_Dedicated state (Iu mode). Before the MS has acquired NC parameters when entering a new cell, the MS shall assume mode NC0 unless NC0, NC1 or NC2 mode was explicitly commanded by a PACKET CELL CHANGE ORDER message in the previous cell.

All signalling for support of network controlled cell re-selection and measurement reports are defined in 3GPP TS 44.060.

If the MS operates in NC2 mode, the following rules shall be applied:

The network controls the measurements of UTRAN cells by the parameter Qsearch_P. The network controls the measurements of E-UTRAN cells by the parameter Qsearch_P_E-UTRAN.
The network may control UTRAN measurements per individual UTRAN frequency by the parameters Measurement_Control_UTRAN and E-UTRAN measurements per individual E-UTRAN frequency by the parameters Measurement_Control_E-UTRAN.
The NETWORK_CONTROL_ORDER parameter applies to reselection to E-UTRAN (respectively 3G) CSG cells only if EUTRAN_CSG_NETWORK_CONTROL (respectively 3G_CSG_NETWORK_CONTROL) is set to '1'. If EUTRAN_CSG_NETWORK_CONTROL (respectively 3G_CSG_NETWORK_CONTROL) is set to '0', then the mobile station shall behave as if in NC0 in respect of E-UTRAN (respectively 3G) CSG cells i.e.

the MS may perform autonomous reselection to these cells (subject to the rules applicable to CCN, if enabled);

the MS shall not include measurements of these cells in any measurement reports;

the MS shall enter CCN mode in respect of these cells if all other conditions are met (see 3GPP TS 44.060).

Second Set of Examples

In some embodiments, the mobile station does not enter CCN mode if the target cell is known to be a cell of a defined category, such as an uncontrolled cell.

CCN Mode

A mobile station, which has CCN Enabled, can enter CCN Mode, CCN mode being a state or mode of operation of the mobile station upon having sent a PCCN.

The mobile station shall enable CCN when the following criteria are fulfilled:

the mobile station is camping on a cell (see 3GPP TS 45.008); and the network indicates CCN ACTIVE/3G CCN ACTIVE/E-UTRAN CCN ACTIVE either in system information to all mobile stations in the cell or in an individual order to a certain mobile station; and the mobile station is neither in dedicated mode nor Dual Transfer Mode; and the mobile station is in NC0 or in NC1 mode; and the mobile station is in Packet Transfer mode; and, the target cell is not known to be a CSG cell.

Third Set of Implementation Examples

A) Network Informs Mobile Station Whether Automomous Selection to Cells of Defined Category while in NCC Sent Mode NCCS (NCC sent) mode refers to a mode or state of a mobile station after having sent a NCC. In a specific example, after having sent a PCCN, a mobile station is referred to as being in "CCN mode". In some embodiments, the network sends a parameter to the mobile station to indicate to the mobile station whether autonomous selection to a cell of a defined category while in NCCS mode is permitted. A detailed example of this approach is provided below.

B) Cell Selection and Re-selection to Cells of Defined Category

In some embodiments, if the strongest cell (as suitably defined, see 3GPP TS 25.304 and 3GPP TS 36.304 for an example definition of the strongest cell) which the MS has detected on a given frequency of a RAT (for example UTRAN or E-UTRAN) is a suitable cell of a defined category (for example, an uncontrolled cell, for example a suitable CSG cell—see 3GPP TS 25.304 and 3GPP TS 36.304 for an example of suitability criteria for UTRAN and E-UTRAN CSG cells respectively), the mobile station reselects to the cell if it is not in NCCS mode or is not prohibited from performing autonomous reselection to such while in NCCS mode, for example due to having received from the network the above-introduced parameter that indicates to the mobile station whether autonomous selection to a cell of a defined category while in NCCS mode is permitted, for example by an appropriate setting of the CCN_CSG_RESEL parameter introduced below. A detailed example of this approach is provided below.

C) Cell Change Notification Procedure

In some embodiments, while in NCCS mode the mobile station continues a data transfer and stores neighbour cell system information if received, for example in instances of a PACKET NEIGHBOUR CELL DATA message. However, the mobile station does not perform any cell change to a cell of a defined category (for example an uncontrolled cell, for example a CSG cell) unless autonomous cell changes to such cells during NCCS mode are permitted, for example due to having received from the network the above-introduced parameter that indicates to the mobile station whether autonomous selection to a cell of a defined category while in NCCS mode is permitted, for example by an appropriate setting of the CCN_CSG_RESEL parameter introduced below. In this case, the mobile station may send a further notification of cell change (for example a PCCN) indicating the target cell, leave NCCS mode and perform the cell change. A detailed example of this approach is provided below. If such reselection occurs, the MS may stop any applicable timers and leave NCCS mode.

Combinations of Behaviours

In some embodiments one of the behaviours A), B), C) is implemented. In some embodiments two of the behaviours A), B), C) are implemented. In some embodiments all of the behaviours A), B), C) are implemented.

Network Informs Mobile Station Whether Automomous Selection to Cells of Defined Category while in NCCS Mode is Permitted—Detailed Example A detailed example follows in terms of additions to the SI 2quater Rest Octets defined, for example, in 3GPP TS 44.060 v.9.2.0, 3GPP TS 45.008 v.9.1.0, or 3GPP TS 44.018 v.9.3.0. Only excerpts are shown. The added parameter is referred to as CCN_CSG_RESEL. A similar parameter may be implemented in another message for CSG cells, or for another category of cells.

10.5.2.33b SI 2quater Rest Octets

The SI 2quater Rest Octets information element contains neighbour cell lists for UTRAN and/or E-UTRAN cells and/or CSG cells. For cell reselection to UTRAN, it is used with the SI 2ter Rest Octets information to build the 3G Cell Reselection list, see sub-clause 3.4.1.2.1.7. For cell reselection to E-UTRAN, it is used directly to build the E-UTRAN Neighbour Cell list.

The SI 2quater Rest Octets information element is a type 5 information element with 20 octet length. The following field is included:

<CCN_CSG_RESEL: bit> in the message, defined as follows:

CCN_CSG_RESEL (1 bit field): If this bit is set to '1', autonomous reselection to CSG cells is permitted while in CCN mode (see 3GPP TS 44.060). If set to '0', autonomous reselection to CSG cells is not permitted while in CCN mode.

Cell Selection and Re-selection to Cells of Defined Category—Detailed Example

The following is a specific example implementation of the above method.

Cell Re-selection to CSG cells

If a mobile station is a member of at least one Closed Subscriber Group, i.e. at least one CSG ID is included in the MS's "CSG Whitelist", then, in addition to normal cell reselection, the MS shall use an autonomous search function for UTRAN and/or E-UTRAN CSG cells.

NOTE 1: The autonomous search function is implementation dependent and controls when and/or where to search for allowed CSG cells.

NOTE 1a: The autonomous search function should take into account previously visited allowed CSG cells.

NOTE 2: A cell is a CSG cell if the CSG Indicator in its system information is set to TRUE.

NOTE 2a: A cell for which the CSG Indicator in its system information is set to FALSE but broadcasts a CSG ID is considered by the MS as a CSG cell if its CSG ID matches any of the CSG IDs included in the MS's "CSG Whitelist", otherwise it is considered as a non-CSG cell towards which normal cell reselection applies.

If the strongest cell (see 3GPP TS 25.304 and 3GPP TS 36.304 for the definition of the strongest cell) which the MS has detected on a UTRAN or E-UTRAN frequency is a suitable CSG cell (see 3GPP TS 25.304 and 3GPP TS 36.304 for suitability criteria for UTRAN and E-UTRAN CSG cells respectively), it should reselect to this cell if it is not currently in CCN mode or is not prohibited from performing autonomous reselection to CSG cells while in CCN mode (see 3GPP TS 44.060).

Cell Change Notification—Detailed Example
Cell Change Notification Procedure

If CCN is enabled towards the target cell (see sub-clause 5.5.1.1a and 3GPP TS 44.160), the mobile station shall behave as in network control mode NC0 or NC1 up to the point when a new cell has been chosen. If the target cell is a GSM cell, the mobile station shall then check the CCN_SUPPORTED parameter, if available, that was last received for that cell. This parameter can be sent on BCCH or PBCCH or individually in PACKET MEASUREMENT ORDER or PACKET CELL CHANGE ORDER or PS HANDOVER COMMAND messages.

If for a GSM cell the CCN_SUPPORTED parameter is available and if it indicates that CCN mode shall not be entered towards that cell, then the mobile station shall perform the cell change and not enter CCN mode. If the cell reselection is triggered by the path loss criterion parameter C1 becoming negative, the mobile station may perform the cell change without entering the CCN mode.

If the target cell is a GSM cell and the CCN_SUPPORTED parameter is available and if it indicates that CCN mode shall be entered towards that cell or if the CCN_SUPPORTED parameter is not available, then instead of performing the cell change, the mobile station shall start timer T3206 and enter the CCN mode. At the first possible opportunity, the MS shall then, when in CCN mode, inform the network about the proposed target cell by sending a PACKET CELL CHANGE NOTIFICATION message, stop timer T3206, start timers T3208 and T3210.

If the target cell is a 3G cell and if CCN is activated towards 3G cells or if the target cell is an E-UTRAN cell and the mobile station supports "CCN towards E-UTRAN, E-UTRAN Neighbour Cell measurement reporting and Network controlled cell reselection to E-UTRAN" and if CCN is activated towards E-UTRAN cells, then instead of performing the cell change, the mobile station shall start timer T3206 and enter the CCN mode. At the first possible opportunity, the MS shall then, when in CCN mode, inform the network about the proposed target cell by sending a PACKET CELL CHANGE NOTIFICATION message, stop timer T3206, start timers T3208 and T3210.

If the target cell is a GAN cell and the CCN_SUPPORTED parameter is available and if it indicates that CCN mode shall be entered towards that cell or if the CCN_SUPPORTED parameter is not available, then instead of performing the cell change, the mobile station shall start timer T3206 and enter the CCN mode. At the first possible opportunity, a mobile station may, when in CCN mode, send a PACKET CELL CHANGE NOTIFICATION message that includes the ARFCN/BSIC for the GAN cell and indicates an RXLEV of 63 for the GAN cell and start timers T3208 and T3210.

The PACKET CELL CHANGE NOTIFICATION message shall contain the identity of the proposed target cell.

In CCN mode the mobile station shall continue the data transfer and store neighbour cell system information if received in instances of the PACKET NEIGHBOUR CELL DATA message, but not perform any cell change unless autonomous cell changes to CSG cells during CCN mode are permitted (see CCN_CSG_RESEL parameter in 3GPP TS 44.018), in which case the mobile station shall send a further PACKET CELL CHANGE NOTIFICATION indicating a target CSG cell, leave CCN mode and perform the cell change.

The mobile station shall leave CCN mode when either CCN is no longer enabled (towards all GSM, 3G or E-UTRAN neighbour cells with the CCN_ACTIVE/3G_CCN_ACTIVE/E-UTRAN_CCN_ACTIVE bit or towards the cell that had been re-selected) or when the network has responded with a PACKET CELL CHANGE CONTINUE or PACKET CELL CHANGE ORDER message or a PS HANDOVER COMMAND message or when either of the timers T3206 or T3208 have expired or on reselection to a CSG cell (if permitted).

If the mobile station has been individually ordered to enable CCN, the order is only valid within the cell where the order is given. When a cell change has been performed using the cell reselection procedure, the mobile station shall use CCN in the new cell only if individually ordered in the previous cell with the PACKET CELL CHANGE ORDER message or if individually ordered or broadcast in the new cell. When a cell change has been performed using the PS handover procedure, the mobile station shall enable CCN in the new cell only if individually ordered in the previous cell with the PS HANDOVER COMMAND message or if individually ordered or broadcast in the new cell.

If the cell reselection criteria have changed during the time the MS is in CCN mode but the path loss criterion parameter C1 remains positive, the MS shall, without notifying the network about the new preferred cell, remain in CCN mode until the criteria for CCN mode are no longer fulfilled, unless otherwise specified above. When leaving CCN mode the MS shall obey the new criteria according to the normal rules as specified in sub-clause 5.5.1.1 and 3GPP TS 44.160 and in 3GPP TS 45.008 unless a PACKET CELL CHANGE ORDER or a PS HANDOVER COMMAND message has been received (see bullet 3 above). If the path loss criterion parameter C1 becomes negative while the MS is in CCN mode, the MS may leave the CCN mode without notifying the network and perform the cell change.

Configure Lack of Response to Packet Cell Change Notification to Indicate Reselection not Allowed A packet cell change notification is a message from a mobile station to a serving cell indicating that the mobile station is about to perform a cell change. If the packet cell change is not permitted, in some embodiments, by not responding to the packet cell change notification, the serving cell indicates to the mobile station that the reselection is not permitted. In some embodiments, the mobile station is configured to treat the absence of a response to a packet cell change notification as an indication that the mobile station may not perform its intended reselection. In some embodiments such a configuration only applies for a particular type of cells, such as uncontrolled cells, or a particular type of uncontrolled cells. This approach may be applied to PCCN (Packet Cell Change Notification) such as defined in 3GPP TS 44.060, but more generally may be defined to apply to any message whose purpose is to notify the serving cell of a packet cell change.

New Message to Indicate Reselection not Allowed

In some embodiments, a new message (the Packet Cell Change Prohibited message defined in detail below) is defined to indicate explicitly that the desired reselection (as indicated by, for example, a packet cell change notification message sent by the device) is not permitted. An example message format example is provided below. The message may, for example, be sent on a PACCH (packet associated control channel). In some embodiments, the message is a distribution message in the sense that that all mobile stations which receive it should process it and obey the restriction. In this case, the message may identify a particular cell to which the restriction applies. Alternatively, the message can be mobile station-specific, in which case it may not be necessary to identify the individual cell to which the message applies as the mobile station will be aware of the cell.

In some embodiments, when a mobile station receives such a message in response to a packet cell change notification, the mobile station does not perform autonomous reselection to the cell indicated in the packet cell change notification or to any other cells (if any) indicated in the message.

In some embodiments, where a message is sent to indicate that the desired reselection is not permitted, further information is added to the message. One or more of the following mechanisms may be provided:

a) In some embodiments, the message includes an indication of whether the restriction applies to all potential target cells (i.e. autonomous reselection is completely prohibited) in which case the mobile station is not permitted to send any further packet cell change notification message while the restriction applies.

b) In some embodiments, the message includes an indication that the restriction applies to a particular subset of cells (e.g. uncontrolled cells, CSG cells, non-CSG cells, cells using a particular RAT, operating on a particular frequency, or any combination of these). In such cases, notwithstanding the restriction, the mobile may send a packet cell change notification for a controlled cell. In a specific example, cells are classified by CSG/non-CSG and by RAT.

c) In some embodiments, the message includes an indication that the restriction applies only to the indicated cell. In this case, the mobile may send a packet cell change notification for any other cell.

Timers to Prevent Multiple Packet Cell Change Notifications Indicating the Same Cell In some embodiments, a timer is used to prevent the mobile station from sending a packet cell change notification indicating the same cell for a time period after a previous indication was made, and not permitted, as determined from one of the above mechanisms for example. The timer may start either when the packet cell change notification was sent, or when the mobile station determined that the cell change was not permitted; different time limits may apply depending on the method used to prevent reselection. In some embodiments, a field representing a value for the timer is included in the packet cell change prohibited message. In some embodiments, a default timer value is applied when none is specified in the message.

In some embodiments, different time limits are applied depending on the number of previously sent packet cell change notifications for that cell (e.g. shorter times for initial transmissions, longer times for subsequent transmissions) to account for the possibility that an initial transmission was not received correctly by the network.

Detailed Example

The following is a specific detailed example of the above-described approach, in terms of changes (underlined) to 3GPP TS 44.060 Sub-clause 8.8.3 Cell Change Notification procedure.

3GPP TS 44.060 Sub-clause 8.8.3 Cell Change Notification Procedure

After receiving a PACKET CELL CHANGE NOTIFICATION message from the mobile station the network can behave in different ways as described below:

1) The network responds with a PACKET CELL CHANGE CONTINUE message.

If a mobile station as response to a PACKET CELL CHANGE NOTIFICATION message receives a PACKET CELL CHANGE CONTINUE message without receiving any neighbour cell system information, the mobile station shall stop timer T3208, stop timer T3210 if still running, leave CCN mode and continue cell reselection in NC0/NC1 mode.

2) The network sends first necessary system information for the cell proposed in the PACKET CELL CHANGE NOTIFICATION message if the proposed target cell is a GSM cell in one or more instances of the PACKET NEIGHBOUR CELL DATA message and sends then a PACKET CELL CHANGE CONTINUE message.

The mobile station shall store the received system information as specified in sub-clause 8.8.1. When the first instance of the PACKET NEIGHBOUR CELL DATA message is received, the mobile station shall stop timer T3210 if still running When the PACKET CELL CHANGE CONTINUE message is received, the mobile station shall stop timer T3208, leave CCN mode and continue the cell reselection in NC0/NC1 mode irrespective of the cell indicated in the ARFCN and BSIC parameters in the PACKET CELL CHANGE CONTINUE message.

3) The network sends first necessary system information for the cell proposed in the PACKET CELL CHANGE NOTIFICATION message if the proposed target cell is a GSM cell, or for any other GSM cell, in one or more instances of the PACKET NEIGHBOUR CELL DATA message and sends then a PACKET CELL CHANGE ORDER message or a PS HANDOVER COMMAND message.

The mobile station shall store the received system information as specified in sub-clause 8.8.1. When the first instance of the PACKET NEIGHBOUR CELL DATA message is received, the mobile station shall stop timer T3210 if still running When the PACKET CELL CHANGE ORDER message is received, the mobile station shall stop timer T3208, leave CCN mode and follow the procedures as specified for the PACKET CELL CHANGE ORDER message (sub-clause 8.4) and in sub-clause 8.8.1. When the PS HANDOVER COMMAND message is received, the mobile station shall stop timer T3208, leave CCN mode and follow the procedures as specified for the PS HANDOVER COMMAND message in sub-clause 8.10.4.

4) The network orders the mobile station into NC2 mode.

A mobile station may in response to a PACKET CELL CHANGE NOTIFICATION message receive a PACKET MEASUREMENT ORDER message from the network indicating NC2 mode. When the mobile station receives the NC2 order it shall leave CCN mode, stop timer T3208, stop timer T3210 if still running, and go into NC2 mode.

When the NC2 mode has been ordered, the network may send PACKET NEIGHBOUR CELL DATA messages on the PACCH before sending the PACKET CELL CHANGE ORDER message to the mobile station. When the NC2 mode has been ordered, the network shall send PACKET NEIGHBOUR CELL DATA messages on the PACCH before sending the PS HANDOVER COMMAND message (see sub-clause 8.10.2) to the mobile station except if these messages are not needed by the mobile station (i.e. for the case of PS handover to a GAN cell).

5) No network response

When timer T3210 expires, the mobile station shall retransmit once the PACKET CELL CHANGE NOTIFICATION message at the first possible opportunity.

When timer T3208 expires, the mobile station shall leave CCN mode and continue cell reselection in NC0/NC1 mode as described in sub-clause 5.5.1.1 and 3GPP TS 44.160 and in 3GPP TS 45.008.

6) Reject the proposed cell change

A mobile station may in response to a PACKET CELL CHANGE NOTIFICATION message receive a PACKET CELL CHANGE PROHIBITED message. When the mobile station receives this message, it shall leave CCN mode (CCN mode being the mode the mobile is in once it has determined to perform reselection & has sent a PCCN message) stop timer T3208, and stop timer T3210 if running The mobile station shall not perform autonomous reselection to the cell indicated in the PACKET CELL CHANGE NOTIFICATION or to any other cells indicated in the PACKET CELL CHANGE PROHIBITED message, nor send a further PACKET CELL CHANGE NOTIFICATION message in respect of these cells for the period indicated in the PACKET CELL CHANGE PROHIBITED message (or for some default time, for example 30s, if no such period is indicated) after the PACKET CELL CHANGE PROHIBITED MESSAGE has been received.

11.2.2b Packet Cell Change Prohibited

This message is sent on the PACCH by the network to the mobile station to command the mobile station not to continue the cell reselection procedure.

Message type: PACKET CELL CHANGE PROHIBITED
Direction: network to mobile station
Classification: non-distribution message TABLE 11.2.2b.1

PACKET CELL CHANGE PROHIBITED message content

< Packet Cell Change Prohibited message content > ::=
  < PAGE_MODE : bit (2) >
    { 0 < GLOBAL_TFI : Global TFI IE >
      { 0 | 1 < RESTRICTION_DURATION : bit (2) > }
      < RESTRICTED_RAT : bit (3) >
      < RESTRICTED_RAT_CSG : bit (2) >
      { 1 { 0 < CSG_FDD_UARFCN : bit
        (14) > | 1 < CSG_TDD_UARFCN : bit (14) > } } ** 0
      { 1 < CSG_EARFCN : bit (16) > } ** 0
      < padding bits >
      ! < Non-distribution part error : bit (*) = < no string > > }
    ! < Address information part error : bit (*) = < no string > > }
  ! < Distribution part error : bit (*) = < no string > > ;

TABLE 11.2.2a.2

PACKET CELL CHANGE PROHIBITED information element details

PAGE_MODE (2 bit field)
This field is defined in sub-clause 12.20.
Global TFI
This information element contains the TFI of the mobile station's downlink TBF or uplink TBF. This field is defined in sub-clause TABLE 11.2.2a.2-continued PACKET CELL CHANGE PROHIBITED information element details 12.10.
RESTRICTION_DURATION (2 bit field)
This indicates the duration for which the restriction applies.
  Bit 2  1
  0  0    5 seconds
  0  1   20 seconds
  1  0   40 seconds
  1  1   indefinitely (while camped on the serving cell)
RESTRICTED_RAT (3 bit field)
This indicates radio access technologies of cells (CSG and non-CSG) to which the restriction applies. If a bit is set to '1', the restriction applies to all cells (CSG and non-CSG) of that radio access technology.
  Bit 3    GERAN
  2    3G (UMTS)
  1    E-UTRAN
RESTRICTED_RAT_CSG (2 bit field)
This indicates radio access technologies of CSG cells to which the restriction applies. If a bit is set to '1', the restriction applies to all CSG cells of that radio access technology.
  Bit 2    3G (UMTS)
  1    E-UTRAN
CSG_FDD_UARFCN
CSG_TDD_UARFCN
These fields, if present, indicate that the restriction applies to CSG cells on the indicated UTRAN frequencies. These fields are formatted as a UARFCN as defined in 3GPP TS 25.101.
CSG_EARFCN
These fields, if present, indicate that the restriction applies to CSG cells on the indicated E-UTRAN frequencies. These fields are formatted as for the E-UTRA Absolute Radio Frequency Channel Number as defined in 3GPP TS 36.104.

Figure 2:
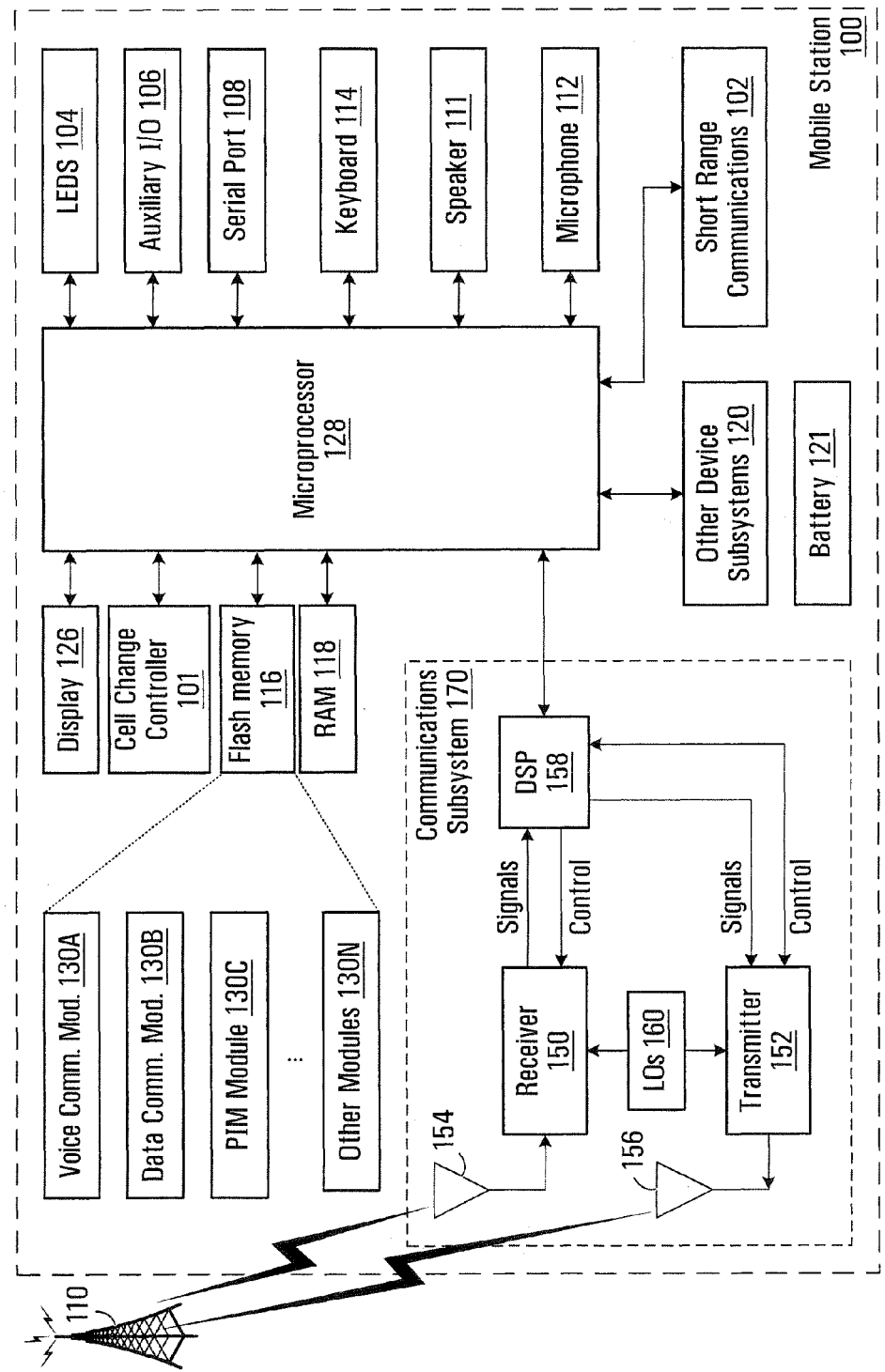
FIG. 2 is a block diagram of a mobile station.

Referring now to FIG. 2, shown is a block diagram of another mobile station 100 that is configured to perform one or a combination of the mobile station implemented methods described in this disclosure. The mobile station 100 is shown with a cell change controller 101 for implementing features similar to those of the cell change controller 24 of the mobile station 10 of FIG. 1. It is to be understood that the mobile station 100 is shown with very specific details for exemplary purposes only.

A processing device (a microprocessor 128) is shown schematically as coupled between a keyboard 114 and a display 126. The microprocessor 128 controls operation of the display 126, as well as overall operation of the mobile station 100, in response to actuation of keys on the keyboard 114 by a user.

The mobile station 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile station 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile station 100 may have a battery 121 to power the active elements of the mobile station 100. The mobile station 100 is in some embodiments a two-way radio frequency (RF) communication device having voice and data communication capabilities. In addition, the mobile station 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile station 100 may also be stored to the RAM 118.

The microprocessor 128, in addition to its operating system functions, enables execution of software applications on the mobile station 100. A predetermined set of software applications that control basic device operations, such as a voice communications module 130A and a data communications module 130B, may be installed on the mobile station 100 during manufacture. In addition, a personal information manager (PIM) application module 130C may also be installed on the mobile station 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The specific design and implementation of the communication subsystem 170 is dependent upon the communication network in which the mobile station 100 is intended to operate. For example, the communication subsystem 170 of the mobile station 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the mobile station 100.

Network access may vary depending upon the type of communication system. For example, in the Mobitex™ and DataTAC™ networks, mobile stations are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile station 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile station 100. In addition, the display 126 may also be utilized in voice communication mode, for example, to display the identity of a calling party, the duration of a voice call, or other voice call related information.

The short-range communications subsystem 102 enables communication between the mobile station 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Those skilled in the art will recognize that a mobile device may sometimes be treated as a combination of a separate ME (mobile equipment) device and an associated removable memory module. Accordingly, for purpose of the present disclosure, the terms "mobile device" and "communications device" are each treated as representative of both ME devices alone as well as the combinations of ME devices with removable memory modules as applicable.

Also, note that a communication device might be capable of operating in multiple modes such that it can engage in both CS (Circuit-Switched) as well as PS (Packet-Switched) communications, and can transit from one mode of communications to another mode of communications without loss of continuity. Other implementations are possible.

Some of the embodiments described can be implemented in the context of one or more of the following standards, all of which are incorporated by reference in their entirety:

3GPP TS 44.060 (latest version is v.9.2.0) "General Packet Radio Service (GPRS); Mobile Station (MS)-Base Station System (BSS) interface; Radio Link Control/Medium Access Control (RLC/MAC) protocol".

3GPP TS 45.008: "Radio subsystem link control". (latest version is v.9.1.0)

3GPP TS 44.018 "Mobile radio interface layer 3 specification; Radio Resource Control Protocol". (latest version is 9.3.0)

3GPP TS 48.008 "Mobile Switching Centre-Base Station System (MSC-BSS) interface; Layer 3 specification" (latest version is 9.1.0)

3GPP TS 43.129 Packed-switched handover for GERAN A/Gb mode; Stage 2 (defines Handover Preparation; latest version is 9.0.0)

3GPP TS 48.018 "General Packet Radio Service (GPRS); Base Station System (BSS)—Serving GPRS Support Node (SGSN); BSS GPRS protocol (BSSGP)" (more PS Handover stuff; latest version is 9.0.0)

Numerous modifications and variations of the present disclosure are possible in light of the above teachings. It is therefore to be understood that within the scope of the appended claims, the disclosure may be practiced otherwise than as specifically described herein.

The invention claimed is:

1. A method for a mobile station, the method comprising:
performing a first behaviour with respect to NCC (notification of cell change) mode and cell change network control in response to signalling of NCC mode and cell change network control in respect of some cells of a given RAT (radio access technology);
notwithstanding the signalling of NCC mode and cell change network control in respect of some cells of a given RAT, performing a second behaviour with respect to NCC mode and cell change network control in respect of cells of a defined category of cells of the given RAT that differs from the first behaviour in some manner.

2. The method of claim 1 wherein the second behaviour is such that the mobile station is configured to never enter NCC required mode in respect of cells of the defined category of cells, nor to send a notification of cell change mode in respect of cells of the defined category of cells.

3. The method of claim 1 wherein the first and second behaviours are such that:
for the defined category of cells, the mobile station is configured to obey the NCC mode signalled for the other cells;
for autonomous reselection, the mobile station is configured to perform in a defined manner in respect of cells of the defined category of cells, irrespective of the cell change network control mode signalled for the other cells.

4. The method of claim 3 wherein the defined manner allows for autonomous reselection to cells of the defined category of cells.

5. The method of claim 1 wherein the first and second behaviours are such that:
for the defined category of cells, the mobile station is configured to obey the cell change network control mode signalled for the other cells;
for NCC mode in respect of the defined category of cells, the mobile station is configured to be behave in a defined manner irrespective of the NCC mode signalled for the other cells.

6. The method of claim 1 wherein the first and second behaviours are such that:
the signalling transmitted for the other cells is also used to determine the behavior for cells of the defined category of cells;
the method comprising:
the mobile station implementing the first behaviour in response to the signalling in respect of other cells;
the mobile station implementing the second behaviour in response to the signalling in respect of the cells of the defined category of cells.

7. The method of claim 1 wherein the second behaviour comprises:
for a defined category of cells of a given RAT, performing at least one of autonomous reselection and notification of cell change notwithstanding one or both of signalled NCC required mode and cell change network control for some cells of the given RAT.

8. The method of claim 7 wherein:
the defined category of cells is CSG cells;
the method further comprising:
receiving an indication that in NC2 mode, CCN is permitted for CSG cells.

9. The method of claim 1 comprising:
receiving at least one indication to signal the first behaviour;
receiving at least one further indication to signal the second behaviour.

10. The method of claim 9 wherein the at least one further indication comprises at least one of:
a field to indicate a cell change network control mode applicable for the defined category of cells;
a field to indicate whether NCC is required for the defined category of cells;
a field to indicate whether NCC is required for the defined category of cells which is distinct from a field to indicate a cell change network control mode applicable for the defined category of cells.

11. The method of claim 9 wherein:
determining the desired behaviour in respect of the defined category of cells in terms of at least one of NCC mode and cell change network control mode as a function of at least one further indication sent for the defined category of cells and at least one indication for some cells.

12. The method of claim 1 comprising:
receiving at least one indication to signal the first behaviour;
determining the second behaviour in respect of a defined category of cells in terms of at least one of NCC mode and cell change network control mode based on at least one of the indications sent for some cells in combination with at least one other criterion.

13. The method of claim 12 wherein the at least one other criterion comprises whether there is support for handover indicated by the serving cell controller.

14. The method of claim 12 wherein the at least one other criterion comprises whether there is support for handover in respect of a target cell.

15. A method for a serving cell controller comprising:
transmitting at least one indication to signal a desired behaviour in respect of some cells in terms of at least one of:

NCC mode; and cell change network control mode;

transmitting at least one further indication to signal a desired behaviour in respect of a defined category of cells collectively in terms of at least one of:

NCC mode; and cell change network control mode.

16. The method of claim 15 wherein the at least one further indication comprises at least one of:

a field to indicate a cell change network control mode applicable for the defined category of cells;

a field to indicate whether NCC is required for the defined category of cells; and a field to indicate whether NCC is required for the defined category of cells that is distinct from a field to indicate a cell change network control mode applicable for the defined category of cells.

17. The method of claim 15 wherein:

wherein the desired behaviour in respect of the defined category of cells in terms of at least one of NCC mode and cell change network control mode is determined as a function of the at least one further indication sent for the defined category of cells and at least one indication for some cells.

* * * * *

UNITED STATES PATENT AND TRADEMARK OFFICE
CERTIFICATE OF CORRECTION

PATENT NO. : 8,374,610 B2  
APPLICATION NO. : 12/690816  
DATED : February 12, 2013  
INVENTOR(S) : David Philip Hole Page 1 of 1

It is certified that error appears in the above-identified patent and that said Letters Patent is hereby corrected as shown below:

On the Title Page, Item (56), last line of FOREIGN PATENT DOCUMENTS, "...2008/131583..." should read --...2008/131589...--

In the Claims:

Column 24, in Claim 5, line 2, "...mobile station is configured to be behave..." should read --...mobile station is configured to behave...--

Signed and Sealed this  
Seventh Day of May, 2013

Teresa Stanek Rea  
*Acting Director of the United States Patent and Trademark Office*